Patented Oct. 30, 1928.

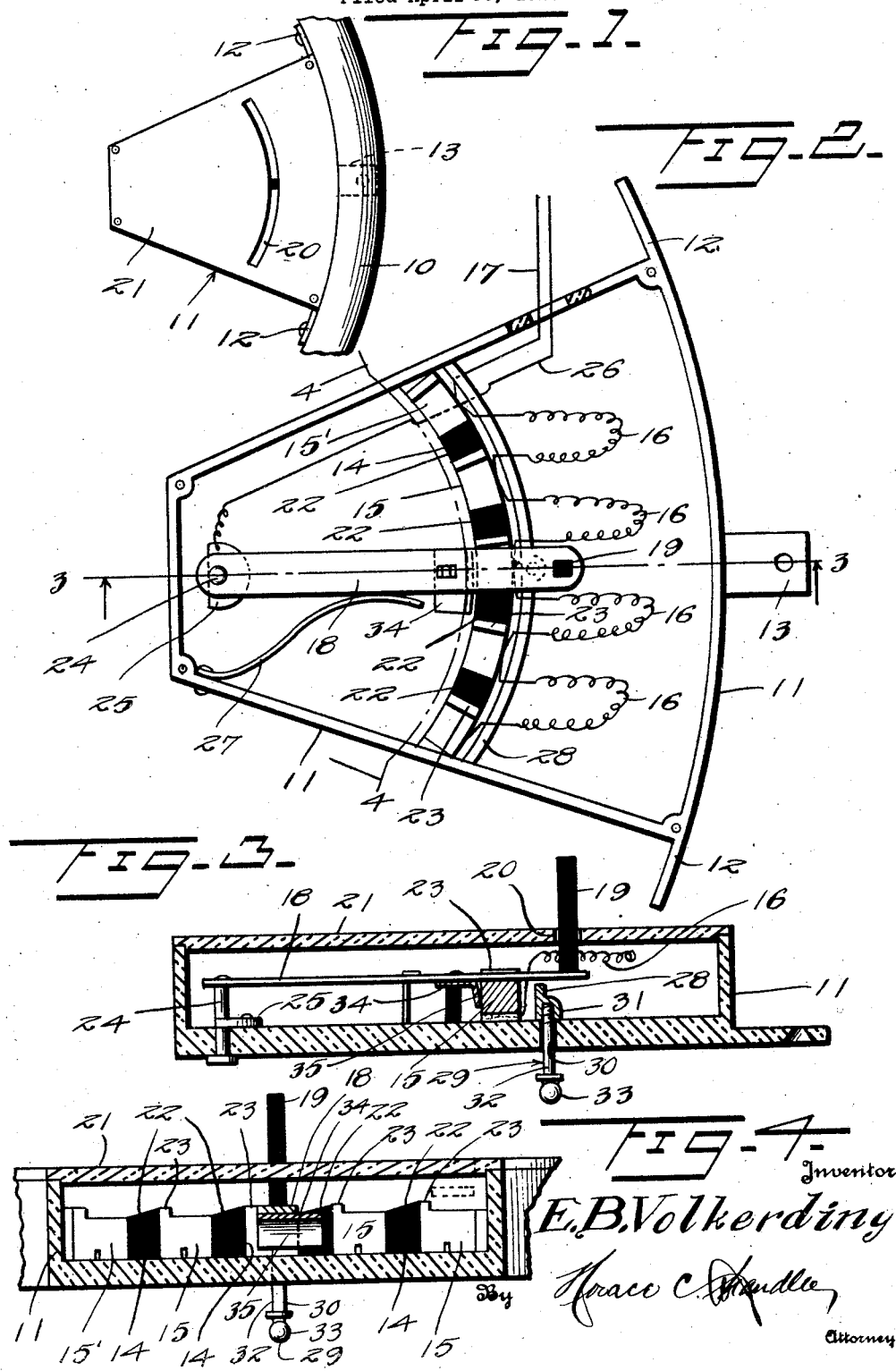

1,689,538

UNITED STATES PATENT OFFICE.

EDMUND B. VOLKERDING, OF ST. LOUIS, MISSOURI.

AUTOMOBILE HEADLIGHT REGULATOR.

Application filed April 30, 1927. Serial No. 187,897.

This invention relates to new and useful improvements in switches, and particularly to switches especially adapted for use in connection with automobile headlights.

Automobile headlights, as now used, are wired so that it is only possible to have them shine brightly or dimly. It is often necessary to have the lights shine to a degree intermediate the present bright and dim, so that such light will not annoy the drivers of approaching machines, while at the same time permitting a degree of brightness sufficient to illuminate the road ahead.

One object of the invention is to provide a switch, or rheostat, of such construction that the driver can lower the brilliancy of the lights, at will, to a degree sufficient to properly illuminate the road ahead, but not bright enough to blind the driver of an approaching automobile.

Another object is to provide a device of this character by means of which the driver can quickly restore the lights to their full brightness, in an emergency.

Another object is to provide a controlling device of this character which is simple in construction, compactly formed, and which can be readily attached to the steering wheel of the automobile, whereby to be within convenient reach of the driver.

Other objects and advantages will be apparent from the following description when taken in connection with the accompanying drawing.

In the drawing:

Figure 1 is a plan view of the device, shown applied to the steering wheel of an automobile.

Figure 2 is a similar view, with the cover plate removed.

Figure 3 is an enlarged vertical sectional view on the line 3—3 of Figure 2.

Figure 4 is an enlarged transverse sectional view on the line 4—4 of Figure 2, showing the manner in which the switch arm is held engaged with a contact plate, and in dotted lines the position of the switch arm when released for returning to normal position.

Referring particularly to the accompanying drawing, 10 represents a portion of the rim of an automobile steering wheel, on which the invention is properly secured.

The invention includes an approximately triangular casing 11, formed with attaching ears 12, at the ends of the wider end thereof, and the single attaching ear 13, at the center of the wider end. Mounted in the casing, intermediate its ends, is an arcuate member composed of alternate insulated blocks 14, and metallic blocks 15. Connecting each adjacent pair of metal blocks 15 is a resistance coil 16, a wire 17 leading from the endmost block 15', to the left of Figure 2, out through an opening in the side of the casing. Pivotally mounted in the smaller end of the casing, and arranged to traverse the series of blocks 14 and 15, is a flexible switch arm 18, the free end of which is provided with an insulated pin 19, projecting upwardly through the arcuate slot 20, in the cover plate 21, of the casing, such pin being arranged to be engaged by the finger of the driver to move the arm 18 over the upper faces of the blocks. It will be noted that each of the insulation blocks 14 has an upper beveled face 22, while the next adjacent metal block 15, to the right thereof, has a small vertical lip 23 extending upwardly to a height equal to the higher side of the block 14, as shown, said lip lying against the adjacent face of the block 14. Thus, when the arm 18 is moved toward the right, as viewed in Figure 2, such arm will ride up on the bevel face 22, and then drop off onto the upper face of the next adjacent metal block 15, beyond the lip thereof, to be held against return movement toward the left.

Secured to the lower face of the switch arm 18 is an obtuse angular metal plate 34, the wing 35 of which is flexible and contacts with the rear or concave faces of the blocks 14 and 15. The wing 35 is of a width approximately once and one-half that of the width of a block 15, whereby said wing will engage the next block 15, before leaving the last one, as the switch arm is moved toward the right, to successively cut in the resistances 16. Thus the change from one degree of brightness to another degree is accomplished without extinguishing the lights, as the continuity of the circuit is maintained when the change is made from one contact to the next.

The pivot of the arm 18 comprises a metal post 24, and secured to the lower end portion of the post, is a metal disk 25, to which disk is secured one end of a wire 26. The wire 26, and the wire 17 lead out through the before mentioned opening in the side of the casing, and are properly connected with the lighting circuit of the automobile, not shown. Secured within the casing is a leaf spring 27, the free end of which bears against one side of the switch arm 18, whereby to normally urge the arm toward the left and against the lips 23, of the metal blocks, with which the arm engages. The extreme left hand block 15' is connected with the bright lights of the automobile, while the other blocks 15, are connected by the resistance coils 16, whereby to dim the lights to varying degrees. Disposed beneath the portion of the switch arm which extends beyond the contact blocks, is an insulated member 28, curved in conformity with the arcuate series of blocks. A handle member, designated as a whole by the numeral 29, is secured to the lower edge of the member 28, and extends downwardly through an opening 30, in the bottom of the casing, so that the operator may place his finger thereon, and press upwardly, with the result that the strip 28 engages and lifts the switch arm above the lips 23, of the blocks 15, so that the spring 27 may quickly swing the arm to the extreme left-hand position, and into engagement with the block 15' whereby to restore the lights to their bright condition. It will be noted that the switch arm is held in elevated position by the member 28, and that said arm slides toward the left, on the upper edge of the arm. Upon lowering the member 28, the arm 18 will flex downwardly into engagement with the upper faces of the blocks. The handle member, beforementioned, comprises an internally threaded boss 31, secured to the central portion of the lower edge of the arcuate member 28, and screwed into said boss is the stem 32, having a knob 33, on its lower end. This construction readily permits the assembling of the parts, whereby the boss lies within the said casing, while the stem and knob are disposed outside thereof, the limit of vertical movement of the arcuate member 28, in its operation of releasing the arm 18, being governed by the length of the stem between the boss and the knob.

When approaching another automobile, the driver places a finger on the stem or pin 19 and moves the arm 18 toward the right, until the arm engages with a contact 15 to produce the desired dimness of the headlights. After passing the automobile, the driver simply presses upwardly on the knob 33, which raises the arm 18, and permits the spring 27 to return the arm to the extreme left-hand position, and thereby restoring the bright lights.

While I have particularly described this control as being used in connection with automobile headlights, I wish it understood that the device may be used with any electric lamps, where it is desired to regulate or change the intensity of the light, and then to quickly restore them to their normal maximum brilliancy, or other normal degree.

What is claimed is:

1. A light control consisting of a rheostat including a series of contacts, a lever for traversing the same and to be successively held thereby, means for moving the lever out of engaging position with respect to the contacts and for holding the lever in such position, and means for restoring the lever to normal position while being held by said moving means.

2. A light control consisting of a rheostat including contacts, a lever arranged to traverse the contacts and to be successively held thereby, means for releasing and slidably supporting the lever out of engaging relation to the contacts, and resilient means normally engaged with the lever for returning the same to normal position when released from the contacts.

3. A rheostat including a series of contacts, a lever arranged to traverse the contacts and to be successively engaged and held thereby, an insulated member for moving the lever out of engaging relation to the contacts and for slidably supporting the lever, and a spring means normally engaged with the lever for sliding the latter into normal position along the insulated member.

4. A light control consisting of a rheostat including a series of contacts each having a retaining shoulder, a flexible arm movable over the contacts and arranged to be held by a contact, a flexible means for normally urging the arm toward one end of the series of contacts, and a bar extending longitudinally of the contacts and having means for moving the same against the arm to flex the latter out of engagement with the contact with which it is engaged whereby to permit the flexible means to move the arm to said end of the series of contacts.

5. A light control consisting of a rheostat including an arcuate series of contacts each having a retaining shoulder, a flexible switch arm pivotally mounted to traverse the series of contacts, an arcuate bar extending longitudinally of the series of contacts and beneath the free end of the switch arm, and means carried by the bar whereby said bar is adapted to be moved against the switch arm to flex the same out of engagement with a contact shoulder, and a spring for restoring the switch arm to normal position along the face of said bar.

In testimony whereof, I affix my signature.

EDMUND B. VOLKERDING.